US012726510B2

(12) United States Patent
Genge et al.

(10) Patent No.: US 12,726,510 B2
(45) **Date of Patent: *Sep. 1, 2026**

(54) NETWORK SECURITY SYSTEMS AND METHODS USING RECURRENT DEVICE ATTESTATION

(71) Applicant: Bitdefender IPR Management Ltd., Nicosia (CY)

(72) Inventors: Bela Genge, Tirgu Mures (RO); Balint Szente, Tirgu Mures (RO); George M. Trif, Stefanestii de Jos (RO)

(73) Assignee: Bitdefender IPR Management Ltd., Nicosia (CY)

( * ) Notice: Subject to any disclaimer, the term of this patent is extended or adjusted under 35 U.S.C. 154(b) by 158 days.

This patent is subject to a terminal disclaimer.

(21) Appl. No.: 18/928,773

(22) Filed: Oct. 28, 2024

(65) Prior Publication Data

US 2025/0247418 A1 Jul. 31, 2025

Related U.S. Application Data

(60) Provisional application No. 63/624,895, filed on Jan. 25, 2024.

(51) Int. Cl.
*H04L 9/40* (2022.01)

(52) U.S. Cl.
CPC ...... *H04L 63/1441* (2013.01); *H04L 63/1425* (2013.01); *H04L 63/1433* (2013.01)

(58) Field of Classification Search
None
See application file for complete search history.

(56) References Cited

U.S. PATENT DOCUMENTS 10,177,915 B2 1/2019 Ignatchenko
10,181,987 B2 1/2019 Gandham
(Continued)

OTHER PUBLICATIONS

European Patent Office (EPO), International Search Report and Written Opinion mailed Mar. 3, 2025 for PCT International Patent Application No. PCT/EP2025/050537, international filing date Jan. 10, 2025, priority date Jan. 25, 2024.
(Continued)

*Primary Examiner* — Amir Mehrmanesh
*Assistant Examiner* — Hassan Saadoun
(74) *Attorney, Agent, or Firm* — Law Office of Andrei D Popovici, PC

(57) ABSTRACT

Some embodiments improve the security of a network of IoT devices via a recurrent re-attestation of network nodes. The frequency of re-attestation may depend on a network role of the respective device (e.g., router vs. end node) and/or on a measure of connectivity of the respective node (e.g., node degree), with highly connected nodes re-attested more often than end nodes. Some embodiments employ a pebble-ripple attestation procedure wherein an administration device transmits an attestation probe to a device via one-to-one messaging (e.g., unicast), and the respective device replies via one-to-many messaging (e.g., multicast). The administration device then attests the identity and/or functionality of the respective device according to the timing of multiple replies from the attested device, each reply traversing the network via a distinct route.

21 Claims, 9 Drawing Sheets

(56) References Cited

U.S. PATENT DOCUMENTS

2005/0132202 A1 6/2005 Dillaway
2019/0138716 A1 5/2019 Huang
2019/0363843 A1 11/2019 Gordaychik
2020/0296128 A1 9/2020 Wentz
2020/0322348 A1* 10/2020 Kathail ............... H04L 63/0876
2020/0322356 A1 10/2020 Sheth
2020/0322386 A1 10/2020 Mani
2021/0328794 A1* 10/2021 Mishra .................. H04L 9/3213
2021/0377737 A1* 12/2021 Zaffino ................ H04W 12/121
2022/0070178 A1* 3/2022 Lee ..................... H04L 63/0876
2022/0078015 A1* 3/2022 Nainar .................... G06F 21/33
2022/0116224 A1 4/2022 Guim
2022/0255916 A1 8/2022 Smith
2023/0013347 A1* 1/2023 Moyer .................. H04L 63/166
2024/0380617 A1* 11/2024 Oliver ..................... G06F 21/44
2025/0112948 A1 4/2025 Lee
2025/0158916 A1* 5/2025 Sharma ................... H04L 12/18

OTHER PUBLICATIONS

European Patent Office (EPO), International Search Report and Written Opinion mailed Mar. 3, 2025 for PCT International Patent Application No. PCT/EP2025/050543, international filing date Jan. 10, 2025, priority date Jan. 25, 2024.
Moreau et al., “CRAFT: A Continuous Remote Attestation Framework for IoT,” IEEE Access, vol. 9, pp. 46430-46447, Mar. 22, 2021.
Wedaj, “DADS: Decentralized Attestation for Device Swarms,” ACM Transactions on Privacy and Security, 22 (3):1-29, Jul. 16, 2019.
USPTO, Office Action mailed May 11, 2026 for U.S. Appl. No. 18/928,937, filed Oct. 28, 2024.

* cited by examiner

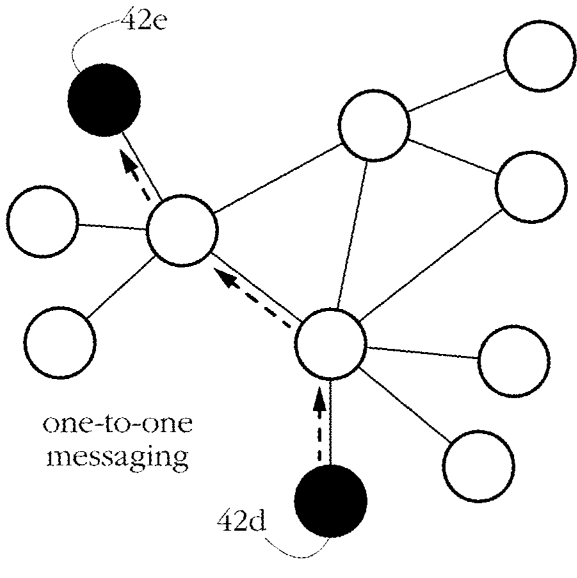
FIG. 8-A
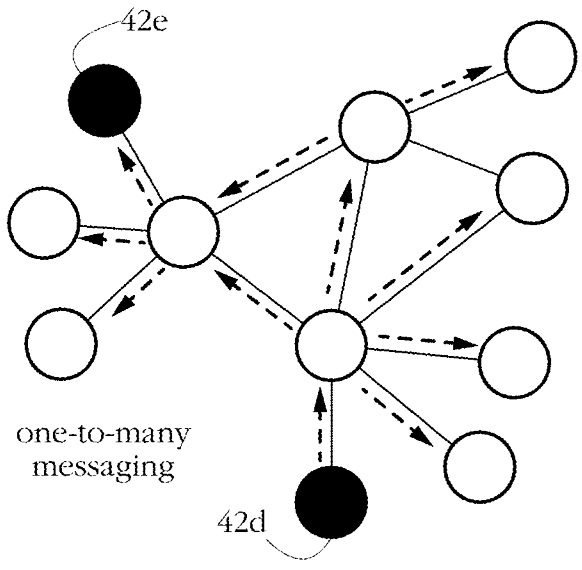
FIG. 8-B

NETWORK SECURITY SYSTEMS AND METHODS USING RECURRENT DEVICE ATTESTATION

CROSS-REFERENCE TO RELATED APPLICATIONS

This application claims the benefit of the filing date of U.S. provisional patent application No. 63/624,895, filed on Jan. 25, 2024, titled "Network Security Systems and Methods," the content of which is incorporated by reference herein.

BACKGROUND OF THE INVENTION

The invention relates to computer security, and in particular to protecting network nodes against threats such as malicious software, intrusion, and spoofing.

A great variety of devices, informally referred to as the Internet of Things (IoT), are currently being connected to communication networks and the Internet. Such devices include, among others, smartphones, smartwatches, game consoles, various computing devices embedded into vehicles, home appliances such as TVs, speakers and other multimedia devices, smart light fixtures, household robots, refrigerators, ovens, surveillance cameras, various sensors, thermostats, sprinklers, etc. Another exemplary category of IoT devices includes a variety of small and portable electronic devices that facilitate routine tasks such as scanning barcodes, paying for groceries, unlocking house and car doors, and starting car engines, among others. Other exemplary IoT devices are used for marketing and/or influencing consumer behavior and include wireless beacons which temporarily connect with a customer's mobile telephone, causing the latter to display adverts or various other notifications. Some such devices may inconspicuously collect data about the respective customer and/or the respective mobile telephone, for instance register the respective person's location, schedule, buying habits, contacts, etc.

The proliferation of IoT devices is also driving innovation in networking and communication protocols that enable connecting such devices to local networks and the Internet. Protocols such as Zigbee® and Bluetooth® Low Energy (BLE) are specifically devised for interconnecting battery-powered IoT devices. Other emerging protocols and network technologies such as Thread and Matter are geared toward device interoperability across heterogeneous networks, various equipment vendors, and various carrier media.

As more IoT devices go online, they become targets for computer security threats such as malicious software and hacking. Left unprotected, IoT devices may expose the public to substantial risks ranging from burglary to data theft, fraud, and loss of privacy. A typical example of attack comprises employing a rogue device to impersonate a legitimate IoT device thereby tricking a network controller/administrator into granting access to an existing network. The rogue device may then be used, for instance, to control other devices on the network (e.g., to open a door lock, start a car engine, etc.), to spy on other devices or users, and to exfiltrate valuable data from the respective network.

In view of the above, there is substantial interest in developing methods of securing IoT devices and communication networks against attack and manipulation by malicious actors.

SUMMARY OF THE INVENTION

According to one aspect, a security appliance is connected to a computer network interconnecting a plurality of client devices. The security appliance comprises at least one hardware processor configured to carry out a recurrent attestation of a selected device of the plurality of client devices, and in response to a failure of the recurrent attestation, determine whether the failure is indicative of a computer security threat. The recurrent attestation includes a plurality of attestation sessions, each attestation session comprising an exchange of messages between the security appliance and the selected device. A length of a time interval between two consecutive sessions of the plurality of attestation sessions is determined according to a measure of connectivity of the selected device within the computer network.

According to another aspect, a computer-implemented method of protecting a plurality of client devices against computer security threats, the plurality of client devices interconnected by a computer network, comprises employing at least one hardware processor of a security appliance connected to the computer network to carry out a recurrent attestation of a selected device of the plurality of client devices, and in response to a failure of the recurrent attestation, determine whether the failure is indicative of a computer security threat. The recurrent attestation includes a plurality of attestation sessions, each attestation session comprising an exchange of messages between the security appliance and the selected device. A length of a time interval between two consecutive sessions of the plurality of attestation sessions is determined according to a measure of connectivity of the selected device within the computer network.

According to another aspect, a non-transitory computer-readable medium stores instructions which, when executed by at least one hardware processor of a security appliance connected to a computer network interconnecting a plurality of client devices, causes the security appliance to carry out a recurrent attestation of a selected device of the plurality of client devices, and in response to a failure of the recurrent attestation, determine whether the failure is indicative of a computer security threat. The recurrent attestation includes a plurality of attestation sessions, each attestation session comprising an exchange of messages between the security appliance and the selected device. A length of a time interval between two consecutive sessions of the plurality of attestation sessions is determined according to a measure of connectivity of the selected device within the computer network.

BRIEF DESCRIPTION OF DRAWINGS

The foregoing aspects and advantages of the present invention will become better understood upon reading the following detailed description and upon reference to the drawings where:

FIG. 8-A illustrates one-to-one messaging between two network nodes according to some embodiments of the present invention.

FIG. 8-B illustrates one-to-many messaging according to some embodiments of the present invention.

DETAILED DESCRIPTION OF THE INVENTION

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Any use of 'or' is meant as a nonexclusive or. Unless otherwise required, any described method steps need not be necessarily performed in a particular illustrated order. A first element (e.g., data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. A database herein denotes any organized, searchable collection of data. A network service is an application providing data storage, manipulation, presentation, communication or other capability over a computer network. Examples of network service include printing, file sharing, dynamic host configuration protocol (DHCP), and domain name services (DNS), among others. The terms 'device discovery' and 'service discovery' are herein used interchangeably. Mobile computing devices encompass smartphones, tablet computers, laptop computers, and wearable computing devices such as smart watches. Computer-readable media encompass non-transitory media such as magnetic, optic, and semiconductor storage media (e.g., hard drives, optical disks, flash memory, DRAM), as well as communication links such as conductive cables and fiber optic links. According to some embodiments, the present invention provides, inter alia, computer systems comprising hardware (e.g., one or more processors) programmed to perform the methods described herein, as well as computer-readable media encoding instructions to perform the methods described herein.

Figure 1:
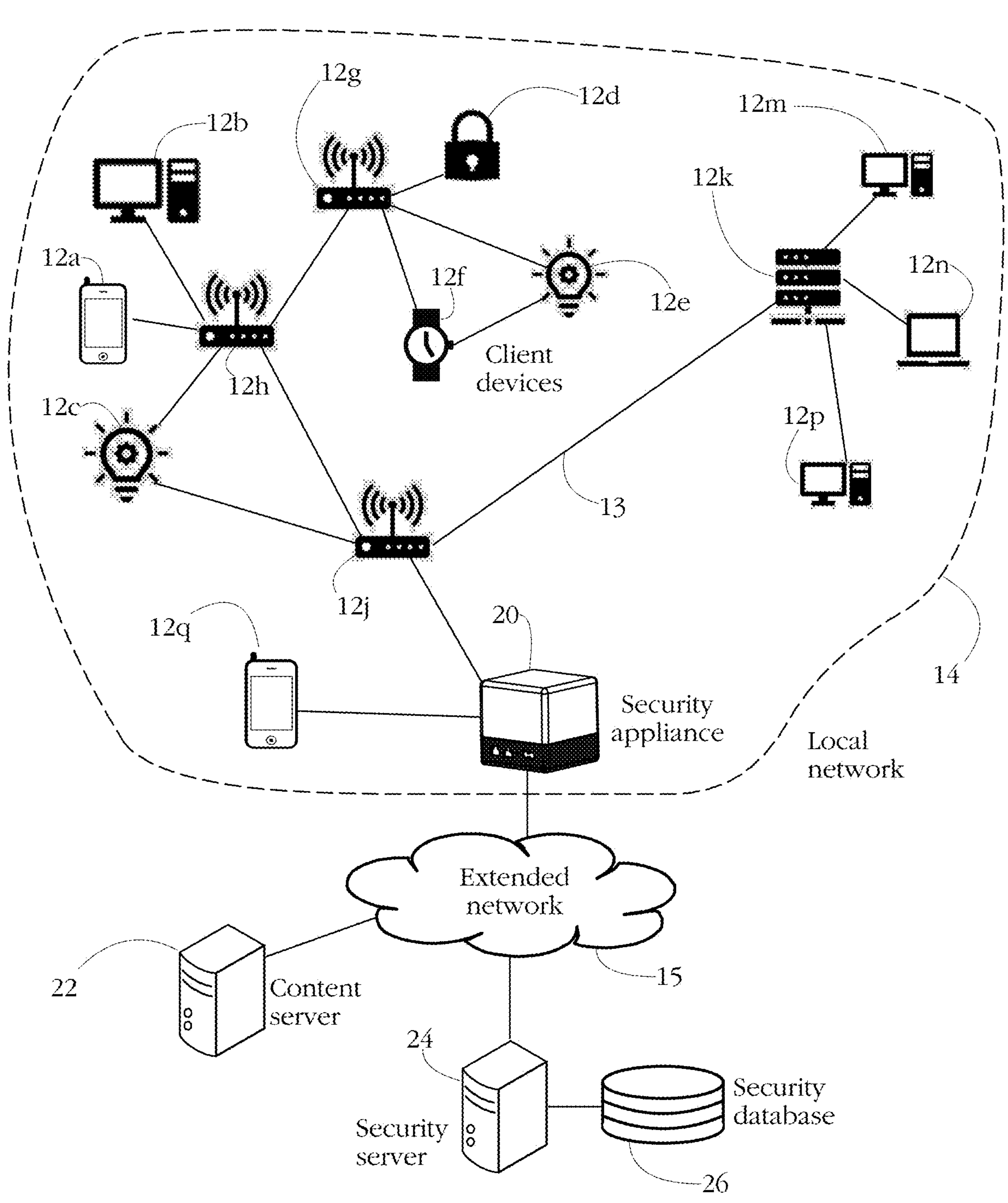
FIG. 1 shows a plurality of interconnected client devices protected against computer security threats according to some embodiments of the present invention.

FIG. 1 shows a plurality of client devices 12$a$-$q$ protected according to some embodiments of the present invention. Exemplary client devices 12$a$-$q$ include personal computers, corporate mainframe computers, mobile computing platforms (e.g., laptop computers, tablets, smartphones), entertainment devices (e.g., TVs, game consoles), wearable devices (e.g., smartwatches, fitness bands), household appliances (e.g., smart lighting systems, door locks, thermostats, refrigerators), network appliances (e.g., routers, switches, etc.), and generally any other electronic device comprising a processor, a memory, and a communication interface enabling the respective device to communicate with other devices/computer systems.

Exemplary client devices 12$a$-$q$ are interconnected to a local network 14 and further to an extended network 15, which may include a wide-area network and/or the Internet. Exemplary local network 14 include a home network and a corporate network, among others. Networks 14 and 15 comprise a set of links 13 generically representing hardware and software interfaces enabling the transfer of data between client devices 12$a$-$q$ and other entities connected to a respective network. For instance, links 13 may include hardware and software components implementing the functionality of a physical layer, data link layer, network layer, and/or transport layer of an open system interconnection (OSI) model of electronic communication. Links 13 may be implemented using any carrier medium and any wired or wireless communication standard and protocol known in the art, Ethernet®, Wi-Fi®, Bluetooth®, Bluetooth® Low Energy (BLE), ZigBee®, Thread, etc.

Some client devices such as exemplary devices 12$g$, 12$h$, 12$j$, and 12$k$ in FIG. 1 may include routers providing data routing and/or network address assignment services (e.g., DHCP) for individual client devices. Some such devices may act as gateways to a subnet and/or subset of client devices. In some embodiments implementing a version of the Thread network standard/protocol, such gateway devices may include a border router. In one such example, a subset of client devices 12$k$-$m$-$n$-$p$ is interconnected via Ethernet® links, and device 12$k$ comprises a border router enabling communications between such devices and another part of network 14 that uses wireless (e.g., Wi-Fi® links). Also, in Thread-compliant embodiments, some client devices known as router-eligible end devices (REED) may occasionally act like routers, relaying received communications to other devices on network 14. Meanwhile, some client devices known as sleepy end devices (SED) communicate only sporadically and only via a router device.

FIG. 1 further shows a content server 22 connected to extended communication network 15. Server 22 comprises a set of computer systems providing access of client systems 12$a$-$q$ to remote resources (e.g., Internet content) and/or various online/cloud services such as device management and configuration, among others.

Figure 2:
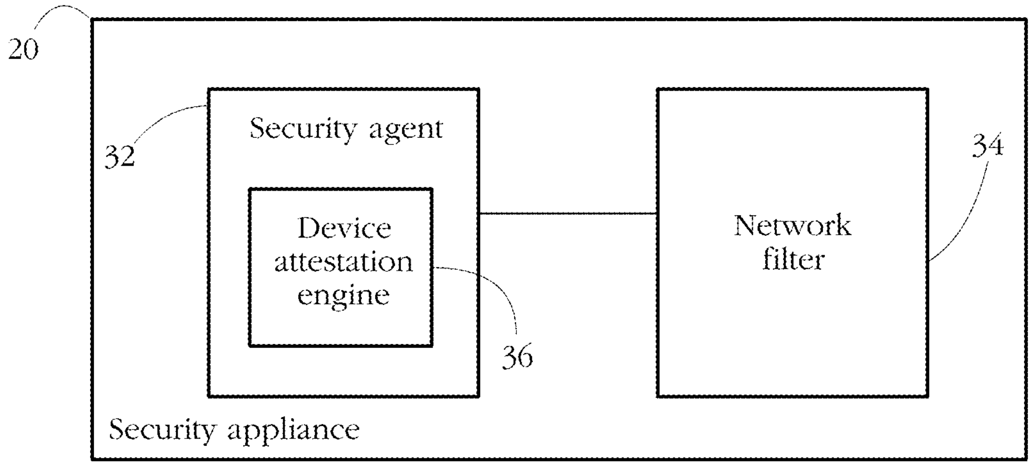
FIG. 2 shows exemplary components of a security appliance according to some embodiments of the present invention.

A security appliance 20 (FIG. 1) is configured to provide network diagnostic services and/or to protect client devices 12$a$-$q$ against computer security threats. In some embodiments, appliance 20 comprises a security agent 32 (FIG. 2)

configured to carry out security and/or network diagnostic services such as attestation of protected client devices 12*a-q*, among others. Appliance 20 may further include a network filter 34 configured to control communication between selected client devices and/or between selected client devices and a remote content server 20. For instance, network filter 34 may prevent a selected client device from accessing a remote resource such as a blacklisted Internet domain/web page. In another example, filter 34 may prevent a selected client device from communicating with other devices and/or from accessing extended network 15 in response to a determination that the respective client device is infected with malware or compromised by a hacker. In some embodiments as illustrated in FIG. 1, appliance 20 is placed in a network gateway position, so that traffic between protected clients 12*a-q* and extended network 15 traverses appliance 20, thus facilitating the operation of network filter 34. The functionality of appliance 20 is described in detail below.

In some embodiments, security agent 32 and/or network filter 34 may be implemented as software, i.e., a set of computer programs executing on a hardware processor of appliance 20. However, a skilled artisan will know that in alternative embodiments, some or all of the functionality of agent 32 and/or filter 34 may be implemented in hardware (e.g., an application-specific integrated circuit-ASIC, a field-programmable gate array-FPGA, etc.), or in a combination of hardware and software.

FIG. 1 further shows a security server 24 connected to extended communication network 15. Server 24 generically represents a set of communicatively coupled computer systems, which may or may not be in physical proximity to each other. In some embodiments, security appliance 20 may collaborate with server 24 to protect client devices 12*a-q*. Stated otherwise, computer security activities may be divided between appliance 20 and server 24. For instance, appliance 20 may collect data from individual devices 12*a-q* and transmit such data to server 24. The collected data may include, among others, a set of static attributes/characteristics of the respective device, a result of an attestation procedure carried out to authenticate or verify an integrity of the respective device, device behavioral data, etc. In turn, server 24 may process the respective data and reply to appliance 20 with a security indicator indicative of whether the respective client device is likely to be malicious/compromised. Parameters of security services performed by server 24 and/or security appliance 20 may be defined according to a service agreement and/or subscription.

Various data collected by and/or used by security server 24 may be stored in a security database 26 communicatively-coupled to server 24. Database 26 may be stored in any format known in the art and may allow a selective insertion and retrieval of information.

Figure 3:
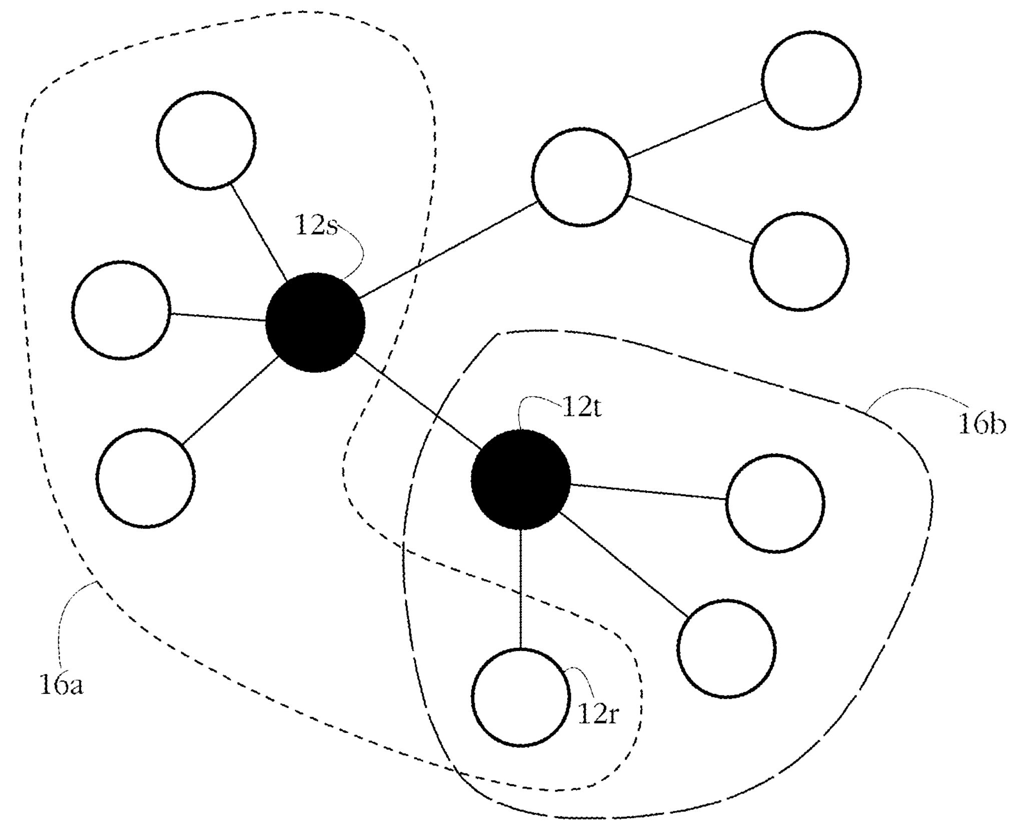
FIG. 3 illustrates a generic computer network and a pair of independent administrative domains according to some embodiments of the present invention.

Some of the client devices connected to local network 14 may be divided among a set of administrative domains, as illustrated in FIG. 3. An administrative domain herein denotes a selected subset of devices collectively providing a specific service or functionality. In one such example, one administrative domain may include a lighting controller and a plurality of smart light fixtures in a home, another administrative domain may include a smart door lock and an electronic key for operating the respective lock, and yet another administrative domain may comprise a smartphone and a smart speaker playing music under the control of the respective smartphone. Actual implementations of administrative domains differ depending on communication protocol, standard, and/or application. For instance, an administrative domain established according to a Bluetooth® communication protocol may consist of a master device and a set of slave devices. In Matter-compliant embodiments, administrative domains are commonly known as 'fabrics'.

FIG. 3 shows an exemplary network and a couple of exemplary administrative domains 16*a-b*. Each domain 16*a-b* includes a respective domain administrator device 12*s-t* comprising a device having network administrative privileges that exceed those of other members of the respective domain. For instance, in some embodiments and protocols, the administrator device is the only member of the respective domain that can add and/or remove members to/from the domain, in a procedure commonly known as commissioning. In some embodiments, the domain administrator device owns a cryptographic certificate enabling the respective device to establish encrypted communication channels with other members of the respective domain. In such embodiments, all encrypted communications carried out within the respective domain are encrypted with keys derived according to the encryption certificate of the domain administrator. In some embodiments, the domain administrator device can selectively invoke specific functionality in other members of the respective domain. In one such example, a domain administrator device includes a smartphone executing an instance of a lighting controller configured to actuate a plurality of smart lighting fixtures.

Some client devices may simultaneously belong to multiple administrative domains, such as exemplary device 12*r* in FIG. 3. In one such example, device 12*r* comprises a thermostat which can be controlled independently by two administrator devices 12*s-t* (e.g., one running an instance of the Apple® Home app, the other an instance of Google® Home app).

Figure 4:
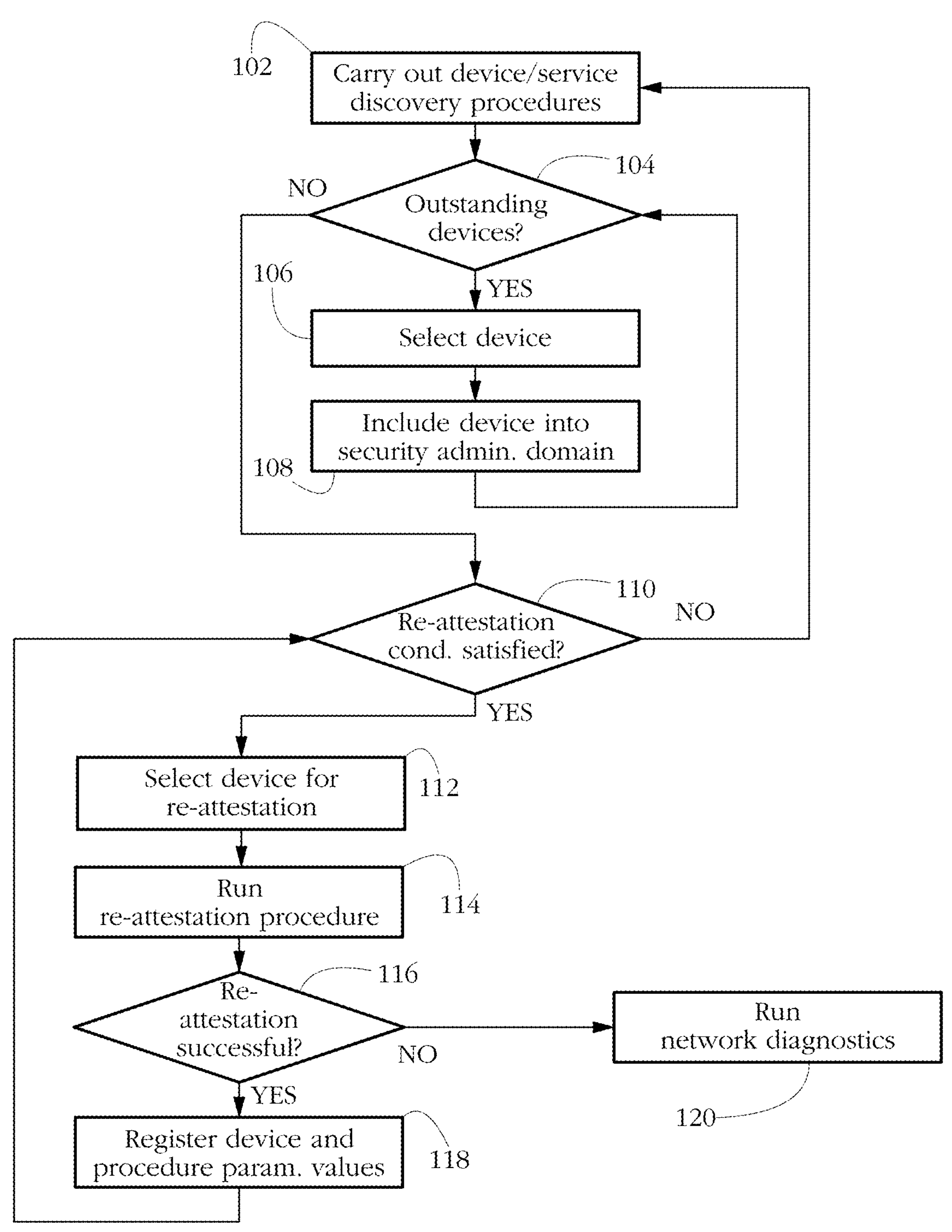
FIG. 4 shows an exemplary sequence of steps carried out by a security agent according to some embodiments of the present invention.

FIG. 4 shows an exemplary sequence of steps performed by security appliance 20 to protect client devices 12*a-q* against computer security threats according to some embodiments of the present invention. A step 102 may comprise carrying out device and/or service discovery procedures. Device and service discovery are well known in the art and comprise basic interactions of networked devices, through which one device (typically an administrator device) becomes aware that another device is connected to the respective network and/or performing a network service such as printing or DNS. Device/service discovery occurs for instance when a new device is introduced to the network, as in a user bringing home a new smart TV and attempting to connect it to an existing home network. Device/service discovery typically comprises at least one of the devices connected to network 14 transmitting a form of advertising message including a device identifier (e.g., medium access control-MAC address, network address, manufacturer, device model), an indicator of a functionality of the respective device (e.g., smart speaker, printer, door lock) or of a network service performed by the respective device (e.g., DNS), and/or a set of communication parameter values (e.g., radio channel, cryptographic parameters, indicators of whether the respective device supports a specific communication protocol such as TCP or UDP, etc.). In return, another network device registers such indicators and possibly configures some parameters of communication with the advertising device according to the received advertising message. Depending on protocol and device type, device/service discovery may be initiated by either one of the devices participating in the discovery procedure. Device/service discovery may be entirely automatic or may include steps conducted by a human operator. An exemplary assisted discovery procedure may include displaying a configuration interface to a human operator and receiving input from the respective operator via the respective interface.

A sequence of steps 104-106-108 may then be carried out for each discovered device. In some embodiments, security appliance 20 sets up a distinct security administration domain (e.g., a Matter fabric) separate from other domains currently defined over network 14, the security domain used for network diagnosis and computer security activities as described herein. A step 108 adds a selected device to the security administration domain. In an embodiment implementing a version of the Matter standard and protocol, step 108 may comprise a device commissioning procedure as described for instance in chapter 5 of the Matter Specification, version 1.0, from the Connectivity Standards Alliance. In some such embodiments, security appliance 20 is endowed with a distinct encryption certificate that it uses during commissioning to set up a secure communication channel (i.e., a set of keys for encrypting and decrypting messages) with the commissioned device. The respective channel may then be used for one-to-one messaging between the respective device and security appliance 20, as shown in more detail below. In some embodiments, security appliance 20 attempts to add all client devices 12*a-q* connected to local network 14 to the security administration domain. In alternative embodiments, client devices are added only if they verify certain eligibility criteria, for instance according to a device type or functionality, according to whether a respective device is Matter-compliant, etc. In some embodiments, a human input may be required to validate an inclusion of a selected device into the security administration domain. For instance, a human operator may select devices for inclusion into the security domain.

In some Matter-compliant embodiments, step 108 further comprises a device attestation procedure. Attestation herein denotes a procedure whereby the administration device (herein security appliance 20) obtains proof of a specific attribute, quality, or functionality of the device currently being commissioned into the security administration device. Examples of attestable attributes are identity indicators (e.g., vendor and/or product identifiers, MAC address, etc.) and indicators of whether the respective device complies with a specific protocol or standard such as Matter, among others. In one example of an attestation session, appliance 20 establishes a secure communication channel with the device currently being commissioned, and receives from the respective device a digital attestation certificate including values of attestable attributes, among others. In some embodiments, the attestation certificate may be cryptographically verified by security appliance 20 as part of the device attestation procedure.

Some embodiments rely on the observation that a single device attestation procedure/session, as is typically specified in current communication standards and protocols, may leave local network 14 vulnerable to computer security threats, such as intrusion (hacking) and malicious software. Once a device is attested, it is usually trusted by the respective domain administration device and by other devices on network 14, which means that it can engage in communications with other devices, access various remote resources and services, etc. However, the trust established via attestation may be exploited by unscrupulous entities that manage to take control of the respective device following its attestation. In one scenario, a hacker gains control in response to a legitimate user's inadvertently installing malicious software on a device, for instance via a spear-phishing attack. In another scenario, an intruder may use a rogue electronic device to connect to network 14 by impersonating the attested device. The intruder may thus gain control over at least a part of the respective network and use it for malicious purposes (e.g., to open a door lock, access sensitive data, etc.). Even in the absence of an attack, some IoT devices occasionally update their software and/or some of their operational attributes, so that their profile no longer fits the originally attested one.

Some embodiments directly address such shortcomings by carrying out repeated re-attestations of selected devices. In some embodiments, each client device 12*a-q* included in the security administration domain is re-attested periodically and/or in response to a trigger event, such as a network re-configuration (e.g., change in network topology, moving a device from one room to another, etc.), an introduction of a new device to the security administration domain, a software update, a security incident, etc.

In some embodiments performing periodic re-attestation, each member of the security administration domain is repeatedly re-attested at pre-determined time intervals $T_a$. The re-attestation interval $T_a$ may measure the time elapsed between two consecutive attestation sessions, for instance between the beginning (e.g., initiation, a first step) of a session and the beginning of the next session. Alternatively, $T_a$ may measure the time elapsed between the end (completion, last step, etc.) of a session and the beginning of the next session, or in any other manner indicative of a spacing between consecutive attestations of the same device.

The re-attestation time interval $T_a$ may be specific to each attested client device, and may vary according to various device attributes, such as an appliance type of the respective device (e.g., media player vs. smartphone vs. lighting controller). In one such embodiment, a router may be re-attested more often than a smart lightbulb, based on the observation that the router is more important to the functionality of local network and therefore any attack or malfunction of the router is more consequential than an attack or malfunction of a lighting fixture. Alternatively or additionally, the re-attestation interval $T_a$ may vary according to an expected likelihood that software executing on the respective device has changed within the time interval $T_a$. In one such example, a smartphone may be re-attested more often than a door lock, based on the observation that the smartphone is much more likely to receive software updates and/or to install new applications than the door lock. The re-attestation interval $T_a$ may also vary according to whether a respective device is battery-operated or not. For instance, to extend battery life, battery-operated devices may be re-attested less often than plugged-in devices.

Other exemplary criteria for determining re-attestation interval $T_a$ may include a type of network link connecting the respective device to other devices on the network. For instance, $T_a$ may vary according to whether the respective link is ephemeral or persistent, and/or according to a protocol/standard governing communications over the respective link (e.g., WiFi® vs. BLE).

The re-attestation interval $T_a$ may be further determined according to whether the attested device comprises a mobile computing device (e.g., smartphone, etc.), based on the observation that such devices physically follow their owner and their movement is likely to change the topology of the network. Some embodiments therefore re-attest mobile devices more frequently than fixed devices such as personal computers, thermostats, etc.

In some embodiments, the re-attestation interval $T_a$ may be determined according to a measure of connectivity of a respective attested device within the network. A basic exemplary measure of connectivity may be determined according to a count of client devices 12$a$-$q$ that the respective device is communicating with over network 14. In one such embodiment, a master device controlling multiple IoT devices (lights, thermostats, speakers, door locks, etc.) may be re-attested more frequently than each respective controlled device.

Figure 6:
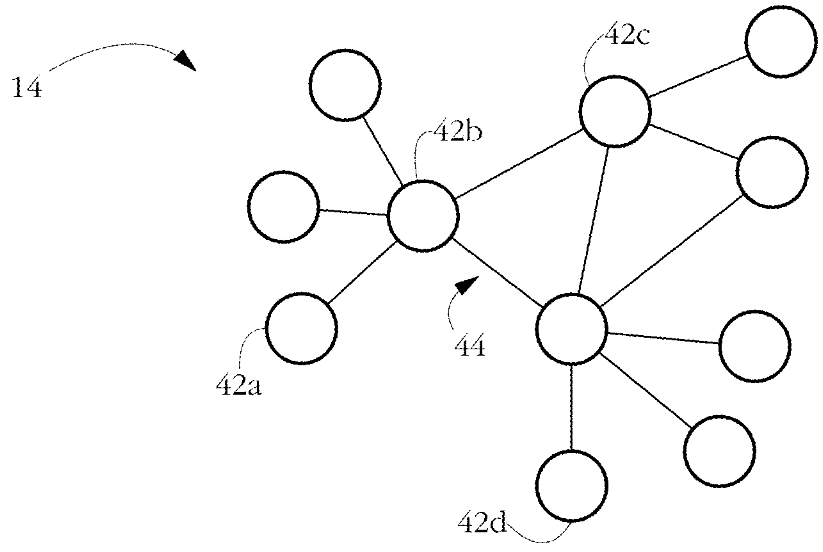
FIG. 6 shows a graph representation of a computer network as a set of nodes connected by edges, according to some embodiments of the present invention.

Some embodiments determine a measure of connectivity according to a degree of a node corresponding to the respective client device in a graph representation of network 14. FIG. 6 shows an exemplary abstract representation of network 14 as a graph comprising a set of nodes (e.g., nodes 42$a$-$d$) interconnected by edges 44. In a graph-theoretical analogy, each client device 12$a$-$q$ in FIG. 1 may represent a graph node, while each network link 13 may correspond to a graph edge. The count of edges connected to a node is known in graph theory as the degree of the respective node. In the example of FIG. 6, nodes 42$a$, 42$b$, 42$c$, and 42$d$ have degree 1, 5, 4, and 1, respectively.

In some embodiments, highly-connected devices (i.e., devices with a relatively high node degree) may be re-attested more often than devices with fewer links (i.e., devices with a relatively low node degree), based on the observation that an attack or malfunction of a highly-connected device is more consequential than one on a more peripheral device. In an exemplary Thread-compliant embodiment, a router may be re-attested more often than a router-eligible end device (REED), which in turn may be re-attested more often than a sleepy end device (SED).

Some embodiments further impose pre-determined upper and/or lower limits on $T_a$, to avoid re-attestations which are either too frequent (therefore impacting performance and user experience) or too rare (therefore compromising on safety). In one such example, $$T_a = \begin{cases} T_{max}, & \text{if } d \le d_{min} \\ T_{min}, & \text{if } d \ge d_{max} \\ T_{max} - \dfrac{T_{max} - T_{min}}{d_{max} - d_{min}}(d - d_{min}), & \text{if } d_{min} \le d \le d_{max} \end{cases}, \quad [1]$$

wherein d denotes the degree of the respective node/client device, while $T_{max}$ and $T_{min}$ represent the upper and lower bounds on the re-attestation time interval, respectively. Practical exemplary values are 1 hour for $T_{min}$ and 72 hours for $T_{max}$. Meanwhile, $d_{min} \geq 0$ and $d_{max}$ respectively denote pre-determined lower and upper bounds on the node degree. For instance, in one embodiment wherein $d_{min}=0$ and $d_{max}=4$, all nodes of a degree higher than or equal to 4 may be re-attested equally often.

The degree of a node (i.e., a count of links connecting a selected device to other devices on network 14) and/or other indicators of connectivity and topology can be determined remotely by security appliance 20, for instance according to routing tables, neighbor tables, and/or by interrogating various network services such as ThreadNetworkDiagnostics in Matter and Thread-compliant embodiments (other protocols and network standards may have similar services and/or allow similar information to be recovered from individual nodes). In some embodiments, appliance 20 performs such determinations periodically and/or in response to specific events (e.g., security events, addition of new devices to the security administration domain, etc.), resulting in up-to-date $T_a$ values for all attestable nodes. In an exemplary Thread-compliant embodiment, SEDs may receive a node degree d=0, and REEDs may receive a node degree d=1.

In some embodiments, a step 110 determines whether a device re-attestation condition is satisfied, for instance whether a specific event has occurred or whether the time elapsed since the latest attestation of a selected device exceeds the respective device's attestation interval $T_a$. When yes, a sequence of steps 112-114 (FIG. 4) performs a re-attestation procedure for a selected device. The procedure itself may implement any attestation method known in the art, for instance the certificate-based attestation involved in device commissioning (as described in chapter 5 of the Matter Specification, version 1.0, from the Connectivity Standards Alliance).

Figure 5:
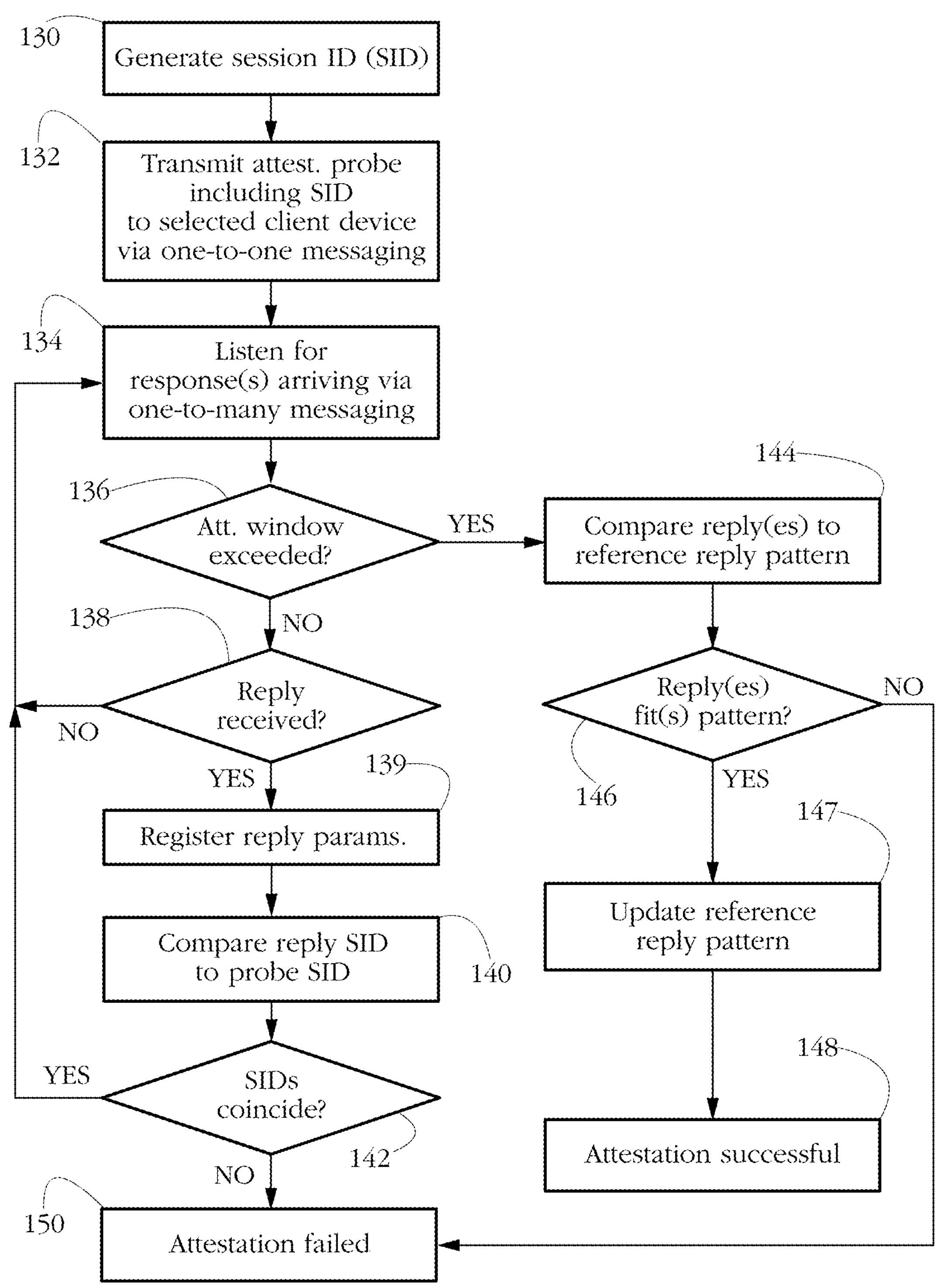
FIG. 5 shows another exemplary sequence of steps performed by the security agent according to some embodiments of the present invention.

FIG. 5 illustrates an exemplary sequence of steps implementing a re-attestation procedure/session according to some embodiments of the present invention. The illustrated steps may be carried out by a component of security appliance 20, for instance device attestation engine 36 (FIG. 2). Conventional attestation typically comprises transmitting a certificate request to an attestable device and attesting various attributes of the respective device according to a content of the received certificate. In contrast to such conventional attestation, the procedure illustrated in FIG. 5 relies on a timing of a received reply instead of, or in addition to, a content of the respective reply. Such timing-based attestation is herein called behavior attestation, since it generally attests a behavior of the respective device in the context of the respective network. In other words, behavior attestation checks whether the respective device behaves as expected (e.g., similarly to the behavior of the respective device observed in a previous attestation session).

Figure 7:
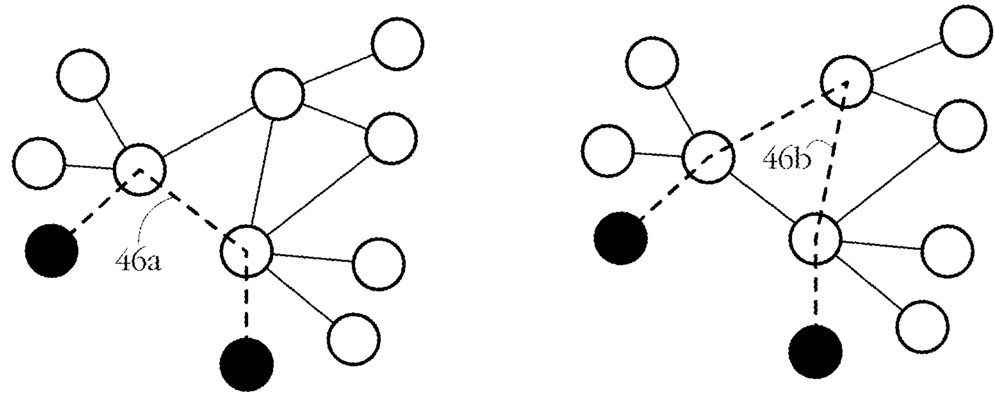
FIG. 7 illustrates two distinct routes connecting a pair of nodes of a generic network according to some embodiments of the present invention.

Behavior attestation as described herein relies on the observation that IoT networks are likely to have a relatively higher overall degree of connectivity compared to conventional WiFi® and Ethernet®-based networks. Modern network standards such as Thread, among others, enable some devices to act as ad-hoc routers, forwarding received messages to neighboring devices and thus bypassing conventional network hubs. Present and future IoT networks are therefore more likely to have a mesh topology, as opposed to a hierarchical, star topology typical to older networking standards. A characteristic feature of the mesh topology is that there may be multiple routes connecting a pair of nodes, as illustrated in FIG. 7, wherein distinct routes 46$a$ and 46$b$ shown as dashed lines traverse a generic network, connecting the same pair of nodes. A route herein denotes a set of contiguous network edges traversing the network between a start node and an end node.

Furthermore, most IoT devices can switch between multiple transport-layer protocols (e.g., TCP, UDP) depending on task and circumstances. Stated otherwise, IoT devices are typically able to communicate via both one-to-one and one-to-many messaging. FIGS. 8-A-B illustrate one-to-one messaging and one-to-many messaging, respectively, according to some embodiments of the present invention. In one-to-one messaging (FIG. 8-A), there is only one sender (an exemplary node 42$d$) and one receiver (an exemplary node 42$e$). A message follows a single route between the sender and the receiver. The respective route is typically determined by a routing algorithm and is not necessarily always the same. One-to-one messaging is also known in the art as unicast and typically comprises setting up a connection/communication channel between the sender and receiver, by a preliminary exchange known as a handshake. The respective communication channel may be encrypted. Exemplary transmission protocols for one-to-one messaging include versions of the transmission control protocol (TCP), among others.

In contrast, in one-to-many messaging (FIG. 8-B), sender node 42*d* transmits the message to multiple other nodes of the network, which in turn forward the respective message to other network nodes (e.g., their immediate neighbors), etc. In one-to-many messaging, multiple instances of the original message traverse the network concurrently, at least some of them eventually reaching a selected destination node. Stated otherwise, multiple instances of a message follow distinct network routes between a sender and a selected destination. One-to-many messaging includes multicast and broadcast schemes and does not require setting up a channel/connection between a sender and receiver. Exemplary transmission protocols for one-to-many messaging include versions of the user datagram protocol (UDP), among others.

Some embodiments of the present invention explicitly use the one-to-many messaging functionality of IoT devices, combined with a mesh topology of the network, for behavior attestation as described herein. The method illustrated in FIG. 5 relies on the receipt of multiple instances of a message originating at the device currently undergoing attestation, each instance following a different route through the network. Harvesting multiple instances of the respective message enables security appliance to efficiently detect changes in both the device itself and the topology of network 14. Such changes may be benign, but may also serve as indicators of a possible attack, malicious activity, or network malfunction.

In a step 130 (FIG. 5), security appliance 20 may generate a session ID uniquely identifying the current attestation session/attempt. The session ID may be generated in any manner known in the art, for instance by hashing. Then in a step 132, appliance 20 may transmit an attestation probe to the client device selected for attestation (see step 112 in FIG. 4), the attestation probe comprising an electronic message transmitted via one-to-one messaging and including the session ID determined in step 130. Such one-to-one messaging may comprise establishing a secure communication channel between appliance 20 and the respective client device, e.g., via a certificate authenticated session establishment (CASE) protocol. Cryptographic parameters of the CASE-established channel may be negotiated between appliance 20 and the respective client device during the initial commissioning of the respective device (see e.g., description of step 108 in FIG. 4). The attestation probe may then be transmitted in cyphertext, so that the session ID may only be available to the device undergoing attestation.

In some embodiments, the attestation probe transmitted in step 132 is further deliberately configured to cause the attested device to respond via one-to-many messaging. Some embodiments use the observation that device/service discovery procedures are typically carried out via one-to-many messaging, and therefore craft the attestation probe to trigger at least a part of a device/service discovery procedure within the attested client device. An exemplary service discovery procedure using one-to-many messaging is described in the Internet Engineering Task Force (IETF) Request for Comments (RFC) 6763, titled "DNS-based Service Discovery". Therefore, an exemplary embodiment may configure the attestation probe to cause the attested device to enter a device/service discovery mode, i.e., advertise its attributes and/or available services. In embodiments implementing a version of the Matter protocol, the attestation probe may be configured to cause the attested device to enter commissioning mode, which may include a device/service discovery procedure comprising broadcasting a domain name service-service discovery (DNS-SD) record. For instance, the attestation probe may include an OpenCommissioningWindow command, as described for instance in the Matter Specification, version 1.0, from the Connectivity Standards Alliance, sections 11.18.8.1 and 5.6.4, among others. Per the Matter standard, the OpenCommissioningWindow command includes a 16-bit discriminator normally used as a device identifier. Some embodiments may use the respective discriminator field to encode a session ID (see step 130 above).

Figure 9:
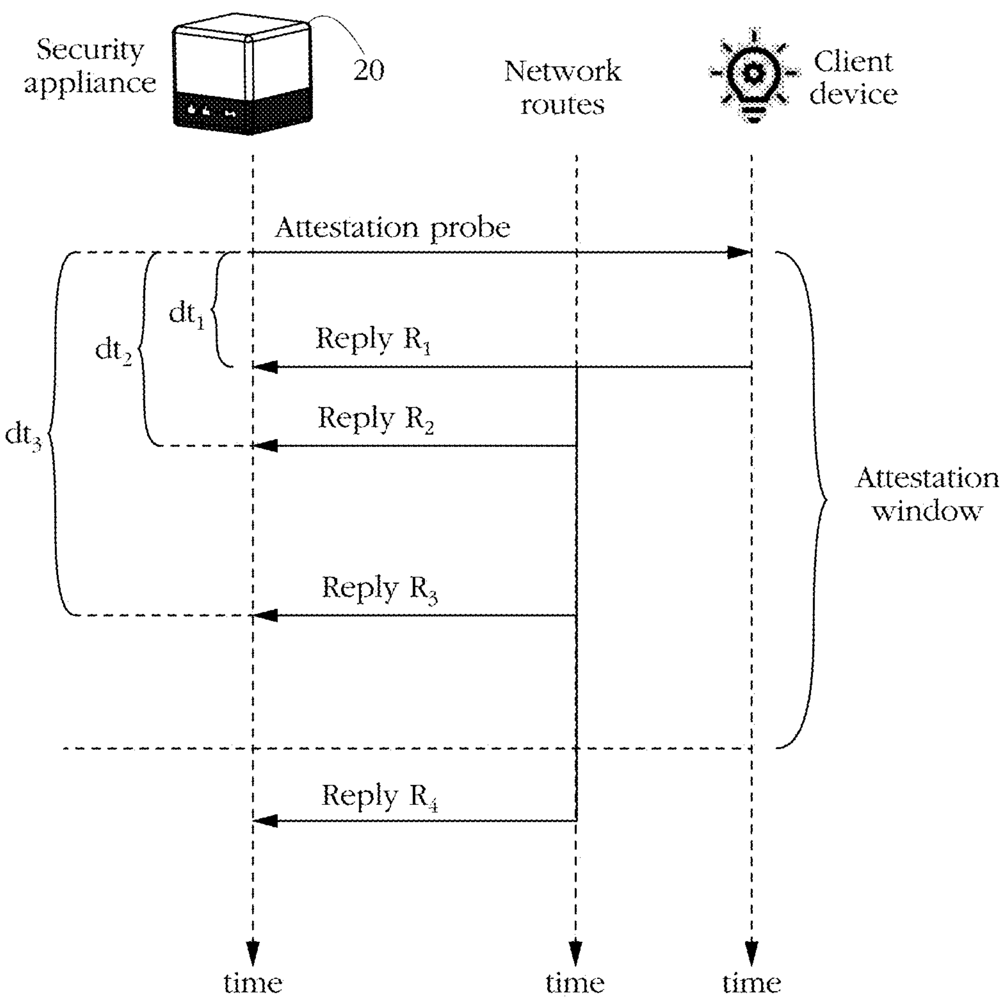
FIG. 9 illustrates an exemplary behavior attestation procedure according to some embodiments of the present invention.

In response to transmitting the attestation probe, a sequence of steps 134-136-138 may listen for replies from the client device undergoing attestation. Since the replies are sent via one-to-many messaging, security appliance 20 may typically receive multiple replies, each reply $R_i$ comprising a distinct instance of a reply message from the currently attested device (as described above in relation to FIG. 8-B). FIG. 9 illustrates behavioral attestation according to some embodiments of the present invention, wherein appliance 20 sends an attestation probe to a selected client device 12 generically representing any of client devices 12*a*-*q* of FIG. 1. In response to the probe, appliance 20 receives a set of attestation replies $R_i$, wherein each reply traverses the network via a distinct route connecting appliance 20 to device 12.

Figure 11:
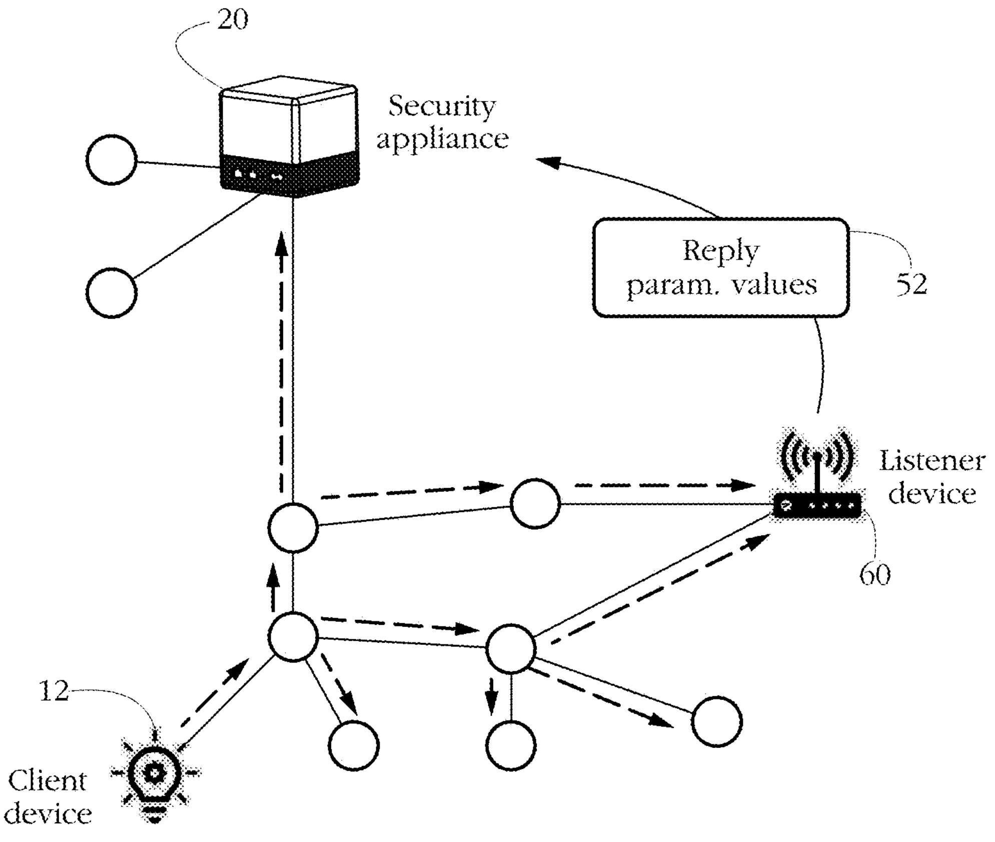
FIG. 11 shows an alternative exemplary behavior attestation procedure using a listener device to register attestation replies according to some embodiments of the present invention.

Some embodiments perform a behavioral attestation according to a timing of attestation replies $R_i$. Timing herein generally refers to any measure of time, encompassing instants and amounts of time. For instance, the timing of a reply $R_i$ may comprise a moment in time $t_i$ when the respective reply arrived/was registered at security appliance 20 or at another listener device 60 as described below in relation to FIG. 11. Alternatively, as illustrated for instance in FIG. 9, timing may refer to a time delay $dt_i$ of the receipt of a respective reply $R_i$, the delay determined with respect to a reference event such as the transmission of the attestation probe or the transmission of the reply by the target device undergoing attestation. In yet another exemplary embodiment, timing of a reply may comprise an amount of time separating the respective reply from a previously received reply. A skilled artisan will know that other interpretations of 'timing' may be used without affecting the scope of the present invention.

In some embodiments, step 136 ensures that appliance 20 listens for replies only for a limited time interval, herein deemed an attestation window (see e.g., FIG. 9). In Matter-compliant embodiments, the attestation window may coincide with a device commissioning window as described in the Matter specification. The extent of the attestation window is typically of the order of a few seconds to a few minutes and may be decided by device attestation engine 36, for instance according to actual tests, according an appliance type of device 12 (e.g., router vs. lightbulb), according to whether the respective device is battery-powered (such devices may be slower to respond than plugged-in devices), according to a communication protocol used by device 12 (e.g., BLE devices may be slower to respond than devices that use WiFi®), etc. The extent of the attestation window may also be chosen so as not to overlap with attestation windows of other attestation sessions.

In response to each received reply $R_i$, a step 139 may register a set of values characterizing the respective reply, such as a timestamp indicating a time of arrival of the respective reply and an identifier of a messenger device that the respective reply was received from. In one-to-many messaging, the messenger device is not the same as device 12 currently being attested, but instead another network device forwarding the respective message on its way to security appliance 20, and may therefore serve as an indicator of a network route followed by the respective reply. Alternatively or additionally, each reply $R_i$ may be associated with an identifier of a network route that the respective message has traveled between the attested device and appliance 20 or some other listener device. Routes may be determined for instance according to routing tables and/or neighbor tables; popular network communication protocols include commands and/or data structures usable for determining such routes. In some embodiments, step 139 may further associate the respective reply $R_i$ with the respective attestation session (e.g., via the session ID) and/or with device 12 (via a suitable device identifier).

In some embodiments, replies $R_i$ from client device 12 are configured to include the same session ID received as part of the attestation probe. For instance, in a Matter-compliant embodiment, the DNS-SD message output by device 12 includes the value of the 'Discriminator' field received with the OpenCommissioningWindow command. In some embodiments, a step 140 determines whether the session ID included in the received reply $R_i$ matches the session ID sent out as part of the attestation probe. A mismatch may indicate that the respective reply belongs to another attestation session. When engine 36 carries out concurrent attestation of multiple devices, step 142 may sort replies by their respective session IDs. However, since the session ID was transmitted to device 12 via a one-to-one communication which may be further encrypted, in principle no other network device beside device 12 should know the correct value of the respective session ID. Therefore, a mismatch between the session ID values of the probe and reply could be indicative of a computer security threat (for instance, of a rogue device masquerading as the device currently undergoing attestation). Some embodiments therefore conclude that attestation failed (step 150) in response to a session ID mismatch.

Figure 10:
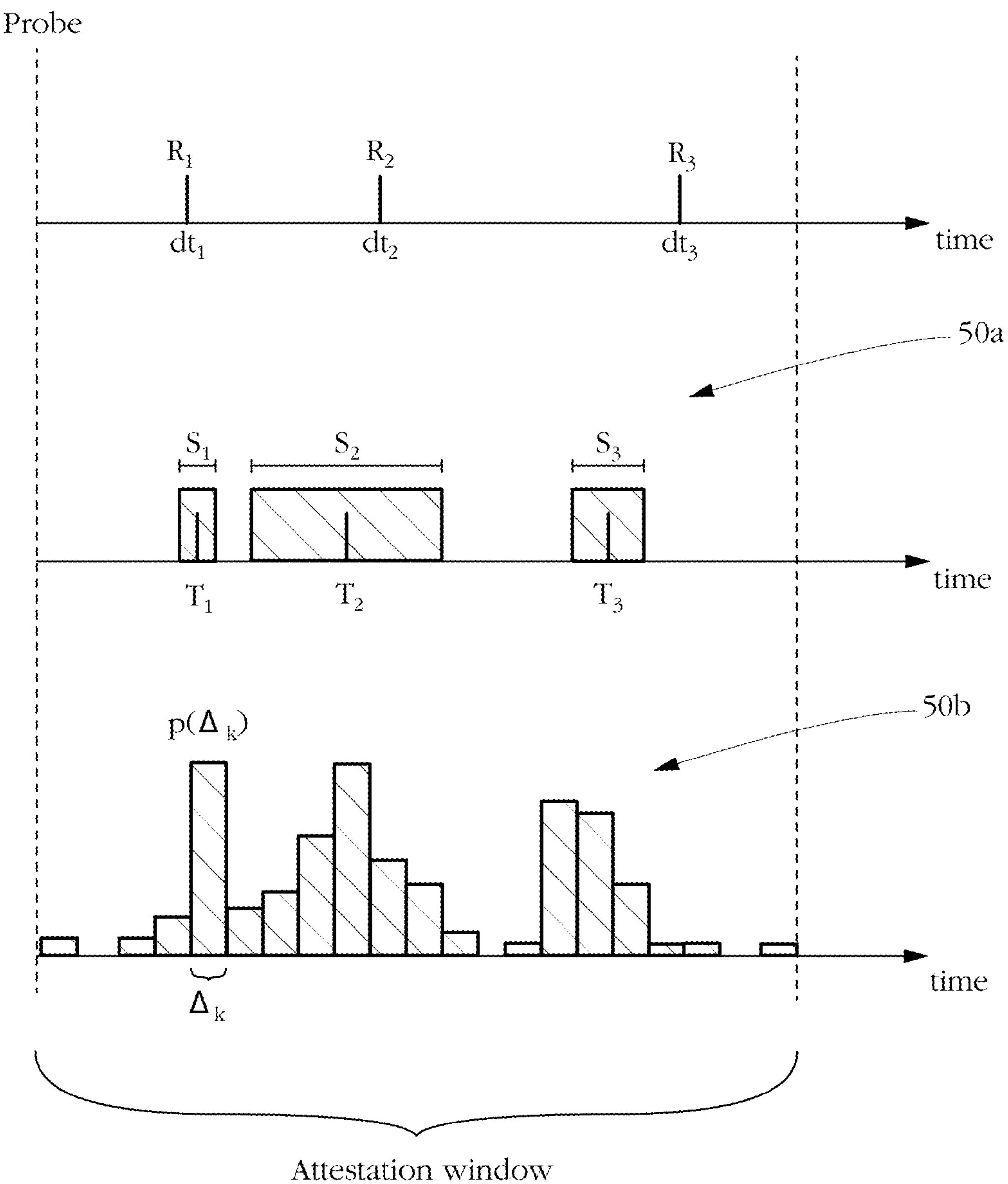
FIG. 10 shows a set of exemplary attestation replies and two alternative versions of a reference reply pattern associated with a respective attestable device according to some embodiments of the present invention.

When the time elapsed since the transmission of the attestation probe exceeds the size of the attestation window, a step 144 may compare the characteristics of the received replies to a reference reply pattern associated with the respective attested device 12. Alternative embodiments may process replies on-the-fly, without waiting for the attestation window to expire first. FIG. 10 shows an exemplary reply timeline comprising a plurality of replies $R_i$, each delayed by a respective amount $dt_i$ with respect to the moment of transmission of the attestation probe. FIG. 10 further illustrates two alternative exemplary reference reply patterns 50*a-b* according to some embodiments of the present invention. Each reference reply pattern 50*a-b* comprises a data structure indicative of a typical or expected timing of attestation replies characteristic of currently-attested client device 12. Patterns 50*a-b* are determined according to a plurality of previous attestation sessions of the respective device.

In some embodiments, a reference reply pattern 50*a* may include a plurality of tuples:

$$\{\{T_1, S_1\}, \{T_2, S_2\}, \ldots, \{T_N, S_N\}\}, \quad [2]$$

wherein each tuple $\{T_i, S_i\}$ describes a distinct reply $R_i$ by way of an average time delay $T_i$ of the respective reply with respect to the moment of transmission of the attestation probe, and a measure of variability (e.g., standard deviation) $S_i$ of the respective time delay. Optionally, each tuple may further include an identifier $m_i$ of a messenger device forwarding the respective reply en route to security appliance 20. Alternatively, $m_i$ may identify a route taken by the respective reply $R_i$ through network 14, if such an indicator is available. A skilled artisan will know that the form of the reference reply pattern shown in Eqn. [2] is only illustrative and not meant to be limiting. Embodiments may employ any of a number of alternatives. In one such alternative example, $T_i$ may represent a time delay separating two consecutive replies, for instance reply $R_i$ from reply $R_{i-1}$. In yet another illustrated example, reference reply pattern 50*b* may be encoded as a probability measure, for instance a set of numbers $\{p(\Delta_k)\}_k$ indicative of a likelihood that a reply will arrive within a time interval $\Delta_k$ following transmission of the attestation probe. Optionally, the probability measure may include a further parameter $m_j$, so that $\{p(\Delta_k, m_j)\}_{k,j}$ denotes a likelihood that a reply will arrive within a time interval $\Delta_k$ via messenger device or route $m_j$.

In some embodiments, engine 36 may determine whether the current attestation replies fit the reference reply pattern of device 12 according to a count of replies $R_i$ received within the current attestation window. Additionally or alternatively, some embodiments may associate each reply with a network route that the respective reply has traveled and may determine whether the current replies fit the reference reply patter according to an order in which replies are received or registered. Yet other exemplary embodiments may assess the fit between current replies and a reference pattern according to characteristics of each reply received within the current attestation window. For instance, for each reply $R_i$, engine 36 may determine whether the time delay $dt_i$ with which the respective reply was received is within a pre-determined amount away from an expected or average time delay indicated in the reference reply pattern. Using the exemplary notation in FIG. 10 and Eqn. [2], engine 36 may determine that registered replies $R_i$ fit the reference pattern if:

$$|dt_i - T_i| \leq S_i/2 \quad [3]$$

for all i. Some embodiments may further check whether each registered reply $R_i$ was received via the same messenger device as indicated in the reference pattern. In the example illustrated in FIG. 10, replies $R_1$ and $R_2$ verify Eqn. [3], while reply $R_3$ does not, hence some embodiments may determine that the illustrated reply timeline does not fit pattern 50*a*.

In an alternative embodiment wherein the reference reply pattern comprises a probability measure, engine 36 may determine that registered replies fit the reference pattern if:

$$p(\Delta_k) \geq P, \quad [4]$$

wherein time interval $\Delta_k$ is selected so that $dt_i \in \Delta_k$ and P denotes a pre-determined threshold (e.g., 80%). Stated otherwise, a reply $R_i$ may fit the reference reply pattern only if the likelihood to receive a reply during that specific time interval exceeds a pre-determined threshold.

When replies received during the current attestation session fit the reference reply pattern (a step 146 In FIG. 5 returns a YES), a step 148 may determine that attestation was successful. Otherwise, in step 150, engine 36 may conclude that attestation of device 12 has failed. In some embodiments, a step 147 may update the device-specific reference reply pattern 50*a-b* associated with values registered in the current attestation session. For instance, some embodiments may recalculate average reply delay(s) $T_i$, delay variability measure(s) $S_i$, messenger device identifiers $m_i$ and/or probability measures $p(\Delta_k, m_i)$ according to $dt_i$ and/or $m_i$ values measured in the current attestation session.

If the current re-attestation of device 12 was successful (a step 116 in FIG. 4 returns a YES), in a step 118 security appliance 20 may register the latest attestation parameter values (e.g. reply delays $dt_i$, messenger device identifiers $m_i$, etc.) and associate them with the respective attested device.

When attestation fails, a step 120 may execute a set of network diagnostic and/or failure mitigation procedures. The reasons for failure may vary from simple, benign ones to more consequential and/or even malicious ones. One example of benign reason is physically moving a client device, for instance a smart speaker, from one room to another of the house. The move may accidentally change the topology of the network, so that the moved device may now connect to security appliance 20 via another router. The move may therefore change the route by which various attestation replies reach appliance 20, which in turn may change the timing of the respective replies. Diagnostics and failure mitigation procedures in such cases may include, for instance, notifying a network administrator. In response to a user input confirming a device move or a deliberate change in the topology of the network, some embodiments may switch to a pattern acquisition mode wherein a few attestation sessions are executed out of schedule, to determine new reference reply patterns for devices affected by the changes.

Another benign reason a re-attestation may fail is a hardware or software failure of a device. Batteries may get depleted; software may crash or may be buggy. Such failures may be relatively easy to detect, because the respective device may simply fail to reply to an attestation probe. However, a failure of a messenger device such as a router may cause changes in the attestation reply timing for multiple devices, since reply messages will follow other routes than before. A diagnostic and mitigation procedure specific to such situations may include identifying and fixing the local problem (restarting the respective device, changing a battery, etc.).

Additions and removals of devices to/from an existing network may change reply timings for multiple devices, and may require re-learning reference reply patterns for all affected devices. Even software or firmware updates may cause a device to behave differently, leading to a re-attestation failure.

Attestation failures may also signal a computer security threat. In one such example, a rogue device may try to masquerade as a legitimate client device. However, since the position of the rogue device on the network is distinct from that of the impersonated legitimate device, attestation replies from a rogue device will typically fail to fit a reference reply pattern of the legitimate device. Such an attack may be further detected by a session ID mismatch as described above in relation to steps 140-142 in FIG. 5.

A session ID mismatch may also indicate an attempt by a third party to add a respective device to an administrative domain distinct from the security domain administered by security appliance 20. Such an attempt may be legitimate or may indicate malicious intent, thus warranting further investigation.

Another example of attack or malicious manipulation that causes a re-attestation failure comprises a denial of service as described for instance in the Common Vulnerabilities and Exposures (CVE®) record CVE-2024-3297, whereby a device may suddenly become unresponsive in response to a malicious manipulation of a secure communication session. A failure to re-attest the respective device may therefore be used to trigger an investigation.

This summary description of some possible causes of a re-attestation failure shows that behavior re-attestation according to some embodiments of the present invention can provide an efficient and timely warning of a network malfunction and a powerful tool for diagnostics and mitigation. Some embodiments may even automate diagnostics, failure mitigation, and/or security analyses performed in response to a re-attestation failure. For instance, in response to failing to re-attest a device, some embodiments may automatically attempt a behavior re-attestation of other selected devices (e.g., specific routers, hubs, devices directly connected to the device that failed re-attestation, etc.). Some embodiments may further implement a decision tree according to a type of the device that failed re-attestation, according to whether the respective failure is an isolated event or other device re-attestations have also failed, etc.

In a simple exemplary diagnostic procedure, in response to a failure to receive a specific reply $R_i$, some embodiments may check whether the current route for receiving reply $R_i$ differs from the expected route (as indicated for instance in the reference reply pattern for the respective device). Such determinations may include building/inspecting routing tables or node neighbor tables for various nodes of the network. A determination that the route has not changed may indicate a malfunction along the respective route. Some embodiments may therefore verify the functionality of each device along the respective route, resulting in an identification of a target device that does not behave according to expectations. The target device may then be inspected for malfunctions, software updates, and computer security threats. Some embodiments may require that the target device be re-attested using a conventional, certificate-based attestation protocol.

The description above has focused on embodiments wherein security appliance 20 sends out attestation probes and also listens for replies to the respective probes. However, some of the methods described above can be adapted to accommodate at least one listener device distinct from appliance 20. In one such exemplary embodiment illustrated in FIG. 11, a listener device 60 connected to network 14 may register a set of attestation replies $R_i$ circulating on the network in response to an attestation probe. Listener devices as described herein may facilitate device attestation and diagnostics of relatively large networks and/or remote parts of network 14. An exemplary listener device may comprise a border router of a Thread network.

Listener 60 may report on the received replies to security appliance 20. For instance, for each registered reply $R_i$, a set of reply parameter values 52 may include a timestamp indicating a moment in time when the respective reply was detected at listener 60, an identifier $m_i$ of a messenger device forwarding the respective reply to listener 60, and a session ID value included in the respective reply. In response to receiving parameter values 52, security appliance 20 may sort the respective data according to session ID and calculate reply delays according to the respective timestamps.

In determining whether attestation replies fit a reference reply pattern of a target device, appliance 20 may use data received from listener 60 instead of, or in addition to, replies registered by appliance 20 itself. In one exemplary embodiment that uses both replies registered at appliance 20 and replies registered at listener 60, a reference reply pattern may further include an identifier of the respective listener device. For instance, pattern 50*a* in FIG. 10 may comprise a set of tuples $\{T_i, S_i, L_i\}$, wherein $L_i$ identifies the listener device that registers the respective reply.

Figure 12:
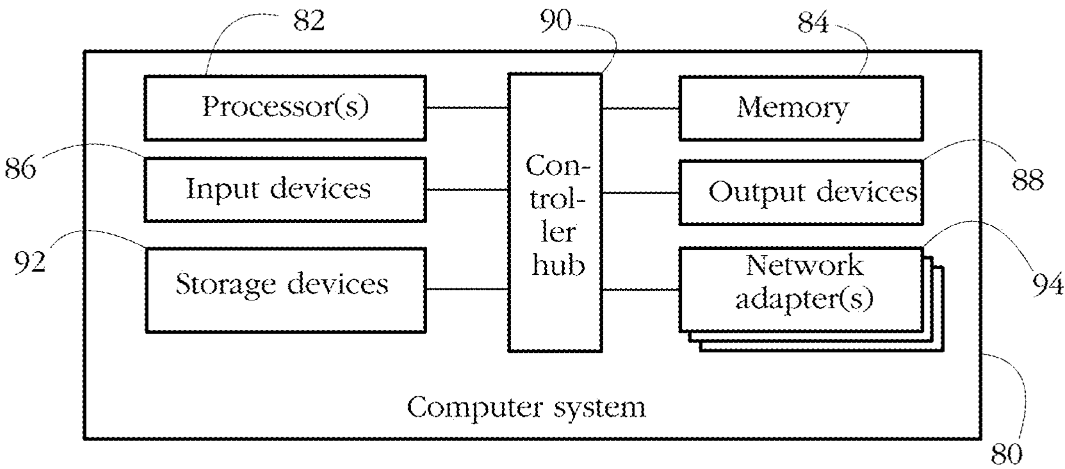
FIG. 12 shows an exemplary hardware configuration of a computing device programmed to execute some of the methods described herein.

FIG. 12 shows an exemplary hardware configuration of a computer system 80 programmed to execute some of the methods described herein. Computer system 80 generically represents security appliance 20, security server 24, and any client device 12*a-q* in FIG. 1. The illustrated computing appliance is a personal computer; other devices such as servers, mobile telephones, tablet computers, and wearables may have slightly different configurations.

Processor(s) 82 comprise a physical device (e.g. microprocessor, multi-core integrated circuit formed on a semiconductor substrate) configured to execute computational and/or logical operations with a set of signals and/or data. Such signals or data may be encoded and delivered to processor(s) 82 in the form of processor instructions, e.g., machine code.

Memory unit 84 may comprise volatile computer-readable media (e.g. dynamic random-access memory-DRAM) storing data/signals/instruction encodings accessed or generated by processor(s) 82 in the course of carrying out operations. Input devices 86 may include computer keyboards, mice, and microphones, among others, including the respective hardware interfaces and/or adapters allowing a user to introduce data and/or instructions into computer system 80. Output devices 88 may include display devices such as monitors and speakers among others, as well as hardware interfaces/adapters such as graphic cards, enabling the respective computing appliance to communicate data to a user. In some embodiments, input and output devices 86-88 share a common piece of hardware (e.g., a touch screen). Storage devices 92 include computer-readable media enabling the non-volatile storage, reading, and writing of software instructions and/or data. Exemplary storage devices include magnetic and optical disks and flash memory devices, as well as removable media such as CD and/or DVD disks and drives. Network adapter(s) 94 enable computer system 80 to connect to an electronic communication network (e.g, networks 14 and 15 in FIG. 1) and/or to other devices/computer systems.

Controller hub 90 generically represents the plurality of system, peripheral, and/or chipset buses, and/or all other circuitry enabling the communication between processor(s) 82 and the rest of the hardware components of computer system 80. For instance, controller hub 90 may comprise a memory controller, an input/output (I/O) controller, and an interrupt controller. Depending on hardware manufacturer, some such controllers may be incorporated into a single integrated circuit, and/or may be integrated with processor(s) 82. In another example, controller hub 90 may comprise a northbridge connecting processor 82 to memory 84, and/or a southbridge connecting processor 82 to devices 86, 88, 92, and 94.

Embodiments of the present invention enable protecting a plurality of client devices across complex communication networks against computer security threats such as malware, hacking and device spoofing, among others. In one exemplary use case, a home network interconnects a multitude of devices including personal computers and smartphones, as well as various IoT devices such as smart home appliances, game consoles, and entertainment devices. Client devices may communicate via different media and protocols, some wired and some wireless. Some devices may be battery operated and only sporadically communicate over the respective network. A transport layer of such networks may be set up and operated according to a unifying standard/protocol such as Thread, among others. Furthermore, an application layer protocol such as Matter may be used to enable application-specific functionality such as network diagnostics and device actuation (e.g., opening a door lock, turning on the lights, setting a thermostat, etc.).

In some embodiments, a security appliance protects the respective network against computer security threats. The security appliance may be installed in a gateway position between the protected network and an extended network such as the Internet (see e.g., FIG. 1). Such a position facilitates security operations, for instance traffic filtering and DNS-based access control. In addition to such conventional security procedures, some embodiments improve network security by way of a recurrent re-attestation of network nodes.

Various attestation methods and procedures are known in the art. A typical device attestation comprises receiving a certificate via a peer-to-peer secure communication channel, said certificate attesting a specific attribute of the respective device, such as an identity, integrity, or a specific aspect of a functionality of the respective device. Conventional attestation is typically performed only once, for instance upon introduction of a new device to the network, since the secure cryptographic mechanisms involved in attestation inherently prevent device spoofing and tampering with certificates.

In contrast to such conventional attestation, embodiments of the security appliance carry out a recurrent re-attestation of each protected network node, based on the observation that the composition and usage patterns of modern IoT networks change relatively fast. New devices are constantly added to the network, while others become obsolete and are disconnected. Various network services are activated or de-activated. Some devices receive software updates on a time scale of a few hours or days, which may change some of their attributes and functionality. As IoT devices become more computationally powerful and sophisticated, their attack surface may also increase, making them more vulnerable to malware. A recurrent re-attestation according to some embodiments of the present invention enables the security appliance to track changes in individual devices and the network as a whole, and to adapt to them in a timely manner.

Re-attestations may be triggered by specific events (e.g., security events, changes in network topology, software or firmware updates, installation of new software, etc.) or may be carried out periodically, with an inter-attestation time interval that is device-specific. The frequency of re-attestation may depend on a network role of the respective device (e.g., router vs. end node) and/or on a measure of connectivity of the respective node (e.g., node degree), with highly connected nodes re-attested more often than end nodes, relying on the observation that a malfunction or attack of a highly connected node has a greater potential of disruption than that of other nodes.

In some embodiments, re-attestation validates a behavior of each protected network node by determining whether a current response of a respective node to a recurrent stimulus matches a previously recorded response characteristic of the respective node. Such attestation is herein called behavior attestation. A behavior attestation procedure according to some embodiments of the present invention comprises the security appliance transmitting an attestation probe to a target device via one-to-one messaging (e.g., unicast), and the target device replying via one-to-many messaging (e.g., multicast). The security appliance may then attest the identity and/or functionality of the target device according to the timing of multiple instances of the reply, each instance traversing the network via a distinct route. For instance, the security appliance may check whether replies to the current attestation probe match a reference reply pattern characteristic for the target device, the reference reply pattern determined according to previous attestations.

Intuitively, behavior attestation as described herein resembles throwing pebbles in a pond and observing the generated ripples. Therefore, device attestation according to the timing of replies to a targeted probe is herein called pebble-ripple attestation. When throwing pebbles into a pond, the timing of the detected ripples encodes not just the location where the pebble hit the water, but also the location of various obstacles such as an island and the pond shore reflecting the ripples on their way to the observer. By analyzing the timing of multiple ripples (i.e., multiple echoes of the pebble hit), the observer may reconstruct the topography of the pond. Similarly, using pebble-ripple attestation in a computer network enables the observer (e.g., security appliance) to reconstruct the topology and connectivity of the network, or at least of a part of the network traversed by one-to-many messages between the attested device and the observer.

On average, the composition and topology of modern IoT networks are much more dynamic than those of conventional networks. Some IoT devices only connect sporadically, to save energy. In modern application-layer protocols such as Matter, among others, some devices may occasionally act as routers, short-circuiting established network routes. Mobile telephones and wearable devices follow their owner around. Other devices such as laptops, smart speakers, and game consoles are frequently relocated, for instance from one room of the house to another. Such movements are likely to change the topology and/or local connectivity of the respective network. By inherently encoding information about the topology and connectivity of the network, recurrent pebble-ripple attestations of selected network devices provide a valuable early detection of changes in the respective network. Such changes may be benign (e.g., a smartphone has moved from one room to another, the battery of a sensor got depleted), but may also indicate malicious activity. Some embodiments therefore use an attestation failure as a trigger for forensic investigations.

Behavioral pebble-ripple attestation may be combined with conventional attestation. In one such example, a reply message from the attested device may include an attestation certificate or any other data attesting an attribute of the respective device. Device attributes attestable via behavior attestation thus include, among others, an identity, a location, a compliance with a selected protocol (e.g., UDP, Matter), and a network service provided by the respective device.

It will be clear to one skilled in the art that the above embodiments may be altered in many ways without departing from the scope of the invention. Accordingly, the scope of the invention should be determined by the following claims and their legal equivalents.

The invention claimed is:

1. A security appliance connected to a computer network interconnecting a plurality of client devices, the security appliance comprising at least one hardware processor configured to:

carry out a recurrent attestation of a selected device of the plurality of client devices wherein:

the recurrent attestation includes a plurality of attestation sessions, each attestation session comprising an exchange of messages between the security appliance and the selected device, and a length of a time interval between two consecutive sessions of the plurality of attestation sessions is determined according to a measure of connectivity of the selected device within the computer network; and in response to a failure of the recurrent attestation, determine whether the failure is indicative of a computer security threat.

2. The security appliance of claim 1, wherein the computer network comprises a plurality of nodes interconnected by a plurality of edges, and wherein the measure of connectivity of the selected device is determined according to a node degree of a selected node of the plurality of nodes, the selected node comprising the selected device.

3. The security appliance of claim 2, wherein the length of the time interval is further constrained between a pre-determined upper bound and a pre-determined lower bound.

4. The security appliance of claim 2, wherein the length of the time interval is further determined according to:

$$T_{max} - \frac{T_{max} - T_{min}}{d_{max} - d_{min}}(d - d_{min}),$$

wherein d denotes the node degree of the selected node, $d_{min}$ and $d_{max}$ are pre-determined lower and upper bounds on the node degree, respectively, and $T_{min}$ and $T_{max}$ are pre-determined lower and upper bounds on the length of the time interval.

5. The security appliance of claim 1, wherein the measure of connectivity of the selected device is determined according to a count of devices of the plurality of client devices that the selected device is communicating with over the computer network.

6. The security appliance of claim 1, wherein the measure of connectivity of the selected device is determined according to whether the selected device is configured to relay incoming communications to other devices of the plurality of client devices.

7. The security appliance of claim 1, wherein the measure of connectivity of the selected device is determined according to whether the selected device is battery-operated.

8. The security appliance of claim 1, wherein the measure of connectivity of the selected device is determined according to a type of network protocol used for communicating with the selected device.

9. The security appliance of claim 1, wherein the length of the time interval is further determined according to whether the selected device comprises a mobile computing device.

10. The security appliance of claim 1, wherein an attestation session of the plurality of attestation sessions comprises the security appliance transmitting an attestation probe to the selected device and determining whether the attestation session is successful according to a timing of a plurality of distinct instances of a reply to the attestation probe, each distinct instance of the reply received from the selected device via a distinct route through the computer network.

11. A computer-implemented method of protecting a plurality of client devices against computer security threats, the plurality of client devices interconnected by a computer network, the method comprising employing at least one hardware processor of a security appliance connected to the computer network to:

carry out a recurrent attestation of a selected device of the plurality of client devices wherein:

the recurrent attestation includes a plurality of attestation sessions, each attestation session comprising an exchange of messages between the security appliance and the selected device, and a length of a time interval between two consecutive sessions of the plurality of attestation sessions is determined according to a measure of connectivity of the selected device within the computer network; and in response to a failure of the recurrent attestation, determine whether the failure is indicative of a computer security threat.

12. The method of claim 11, wherein the computer network comprises a plurality of nodes interconnected by a plurality of edges, and wherein the measure of connectivity of the selected device is determined according to a node degree of a selected node of the plurality of nodes, the selected node comprising the selected device.

13. The method of claim 12, wherein the length of the time interval is further constrained between a pre-determined upper bound and a pre-determined lower bound.

14. The method of claim 12, wherein the length of the time interval is further determined according to:

$$T_{max} - \frac{T_{max} - T_{min}}{d_{max} - d_{min}}(d - d_{min}),$$

wherein d denotes the node degree of the selected node, $d_{min}$ and $d_{max}$ are pre-determined lower and upper bounds on the node degree, respectively, and $T_{min}$ and $T_{max}$ are pre-determined lower and upper bounds on the length of the time interval.

15. The method of claim 11, wherein the measure of connectivity of the selected device is determined according to a count of devices of the plurality of client devices that the selected device is communicating with over the computer network.

16. The method of claim 11, wherein the measure of connectivity of the selected device is determined according to whether the selected device is configured to relay incoming communications to other devices of the plurality of client devices.

17. The method of claim 11, wherein the measure of connectivity of the selected device is determined according to whether the selected device is battery-operated.

18. The method of claim 11, wherein the measure of connectivity of the selected device is determined according to a type of network protocol used for communicating with the selected device.

19. The method of claim 11, wherein the length of the time interval is further determined according to whether the selected device comprises a mobile computing device.

20. The method of claim 11, wherein an attestation session of the plurality of attestation sessions comprises the security appliance transmitting an attestation probe to the selected device and determining whether the attestation session is successful according to a timing of a plurality of distinct instances of a reply to the attestation probe, each distinct instance of the reply received from the selected device via a distinct route through the computer network.

21. A non-transitory computer-readable medium storing instructions which, when executed by at least one hardware processor of a security appliance connected to a computer network interconnecting a plurality of client devices, causes the security appliance to:

carry out a recurrent attestation of a selected device of the plurality of client devices wherein:

the recurrent attestation includes a plurality of attestation sessions, each attestation session comprising an exchange of messages between the security appliance and the selected device, and a length of a time interval between two consecutive sessions of the plurality of attestation sessions is determined according to a measure of connectivity of the selected device within the computer network; and in response to a failure of the recurrent attestation, determine whether the failure is indicative of a computer security threat.

* * * * *